US012141166B2

(12) United States Patent
Modi et al.

(10) Patent No.: US 12,141,166 B2
(45) Date of Patent: Nov. 12, 2024

(54) SYSTEM AND METHOD FOR SERVICE SYNCHRONIZATION

(71) Applicant: Walmart Apollo, LLC, Bentonville, AR (US)

(72) Inventors: Ashutosh D. Modi, Rochester, MN (US); Marcelin M. Lovismartin, Glen Allen, VA (US); Satish Mohan, San Ramon, CA (US); Nayana Garaga Krishnamurthy, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/739,665

(22) Filed: May 9, 2022

(65) Prior Publication Data

US 2023/0359646 A1 Nov. 9, 2023

(51) Int. Cl.
*G06F 16/27* (2019.01)
*G06F 16/23* (2019.01)
*G06F 16/25* (2019.01)

(52) U.S. Cl.
CPC ........ *G06F 16/275* (2019.01); *G06F 16/2365* (2019.01); *G06F 16/256* (2019.01); *G06F 16/258* (2019.01)

(58) Field of Classification Search
CPC .... G06F 16/275; G06F 16/256; G06F 16/258; G06F 16/2365
USPC ........................................................ 707/610
See application file for complete search history.

(56) References Cited

U.S. PATENT DOCUMENTS

| 2007/0073787 | A1 | 3/2007 | Tysowski | |
| 2017/0097970 | A1* | 4/2017 | Bendel | G06F 16/254 |
| 2021/0035031 | A1* | 2/2021 | Yin | G06Q 20/0457 |
| 2021/0342836 | A1* | 11/2021 | Cella | H04L 9/3239 |
| 2021/0382709 | A1* | 12/2021 | Sagal | G06F 8/71 |
| 2022/0019600 | A1* | 1/2022 | Dageville | G06F 16/245 |

FOREIGN PATENT DOCUMENTS

KR 102350282 1/2022

OTHER PUBLICATIONS

Gavin, Lewis; "Change Data Capture: What It Is and How to Use It"; https://rockset.com/blog/change-data-capture-what-it-is-and-how-to-use-it/; Jun. 7, 2021; 9 pages.
Quest Software Inc.; "How to automatically compare and synchronize a shared SQL script folder with SQL Server database data"; https://solutioncenter.apexsql.com/how-to-automatically-compare-and-synchronize-a-shared-sql-script-folder-with-sql-server-database-data/; Feb. 7, 2019; 13 pages.
International Search Report and Written Opinion of PCT/US2023/021114, mailed Jun. 21, 2023, p. 1-9.

* cited by examiner

*Primary Examiner* — Hosain T Alam
*Assistant Examiner* — Nicholas E Allen
(74) *Attorney, Agent, or Firm* — Foley IP Law, PLLC

(57) ABSTRACT

The approaches described herein provide synchronization of data files across different databases used by different services and platforms. The services may be cloud-based services and include databases that include various types of data.

16 Claims, 6 Drawing Sheets

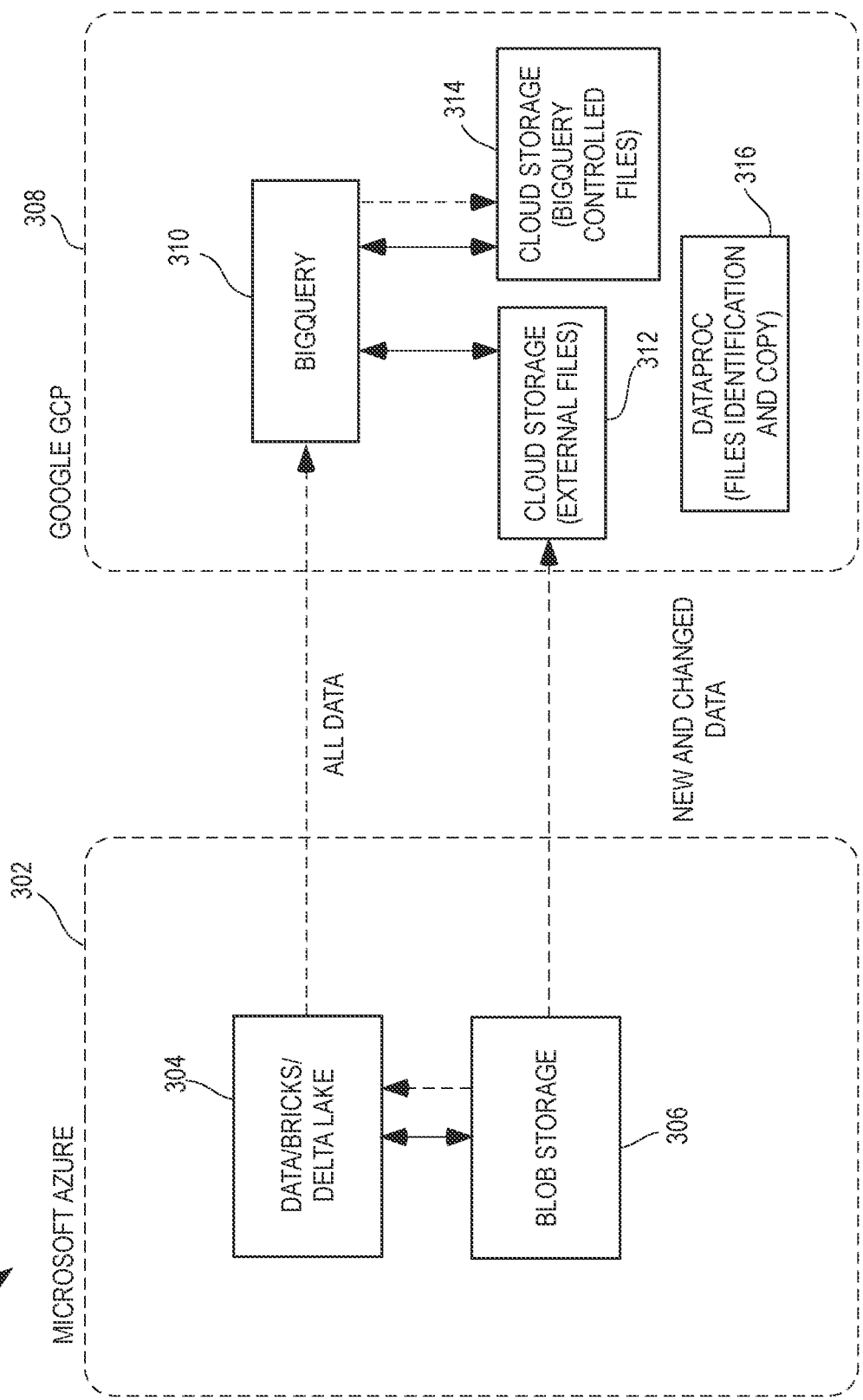

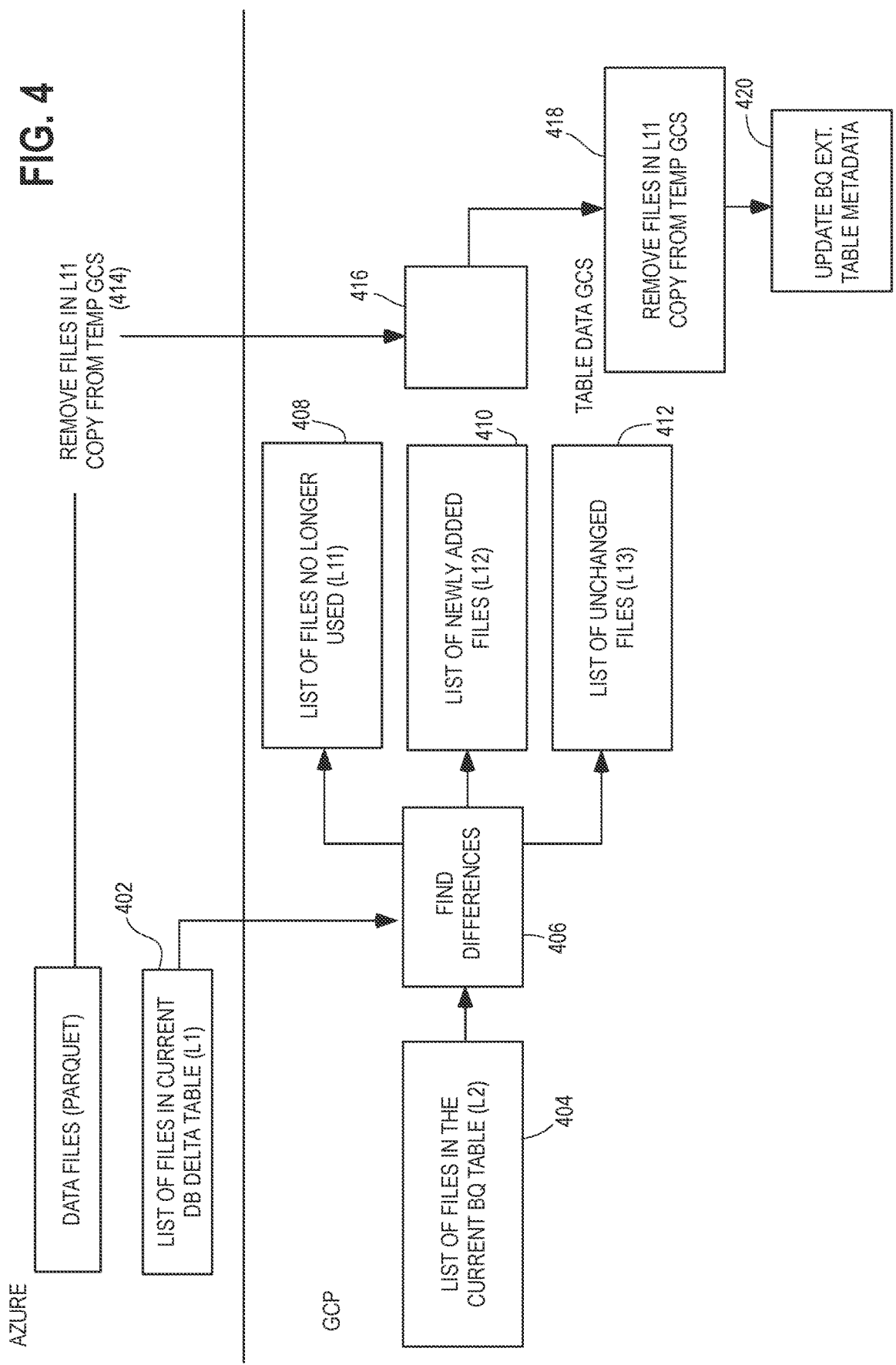

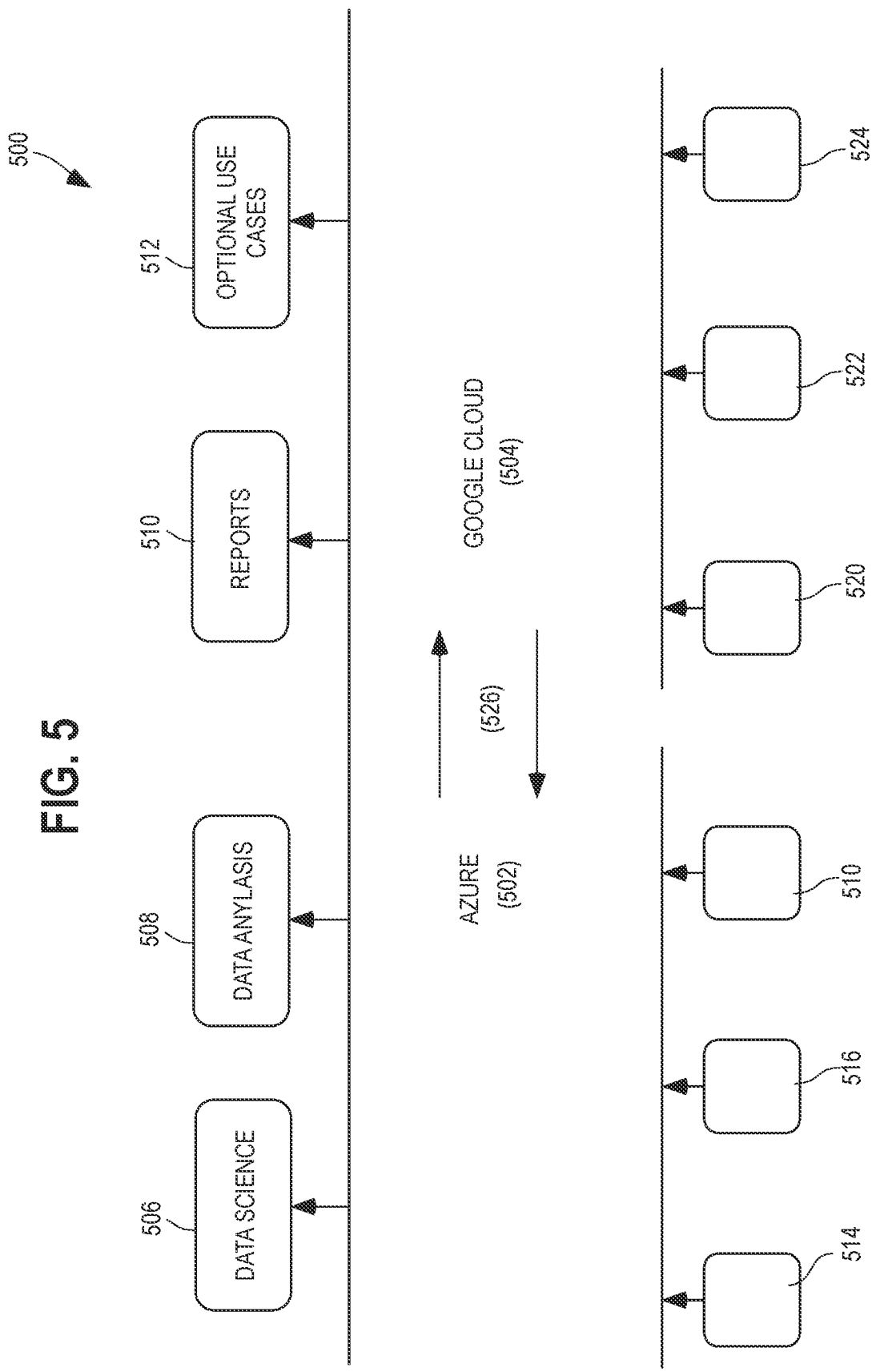

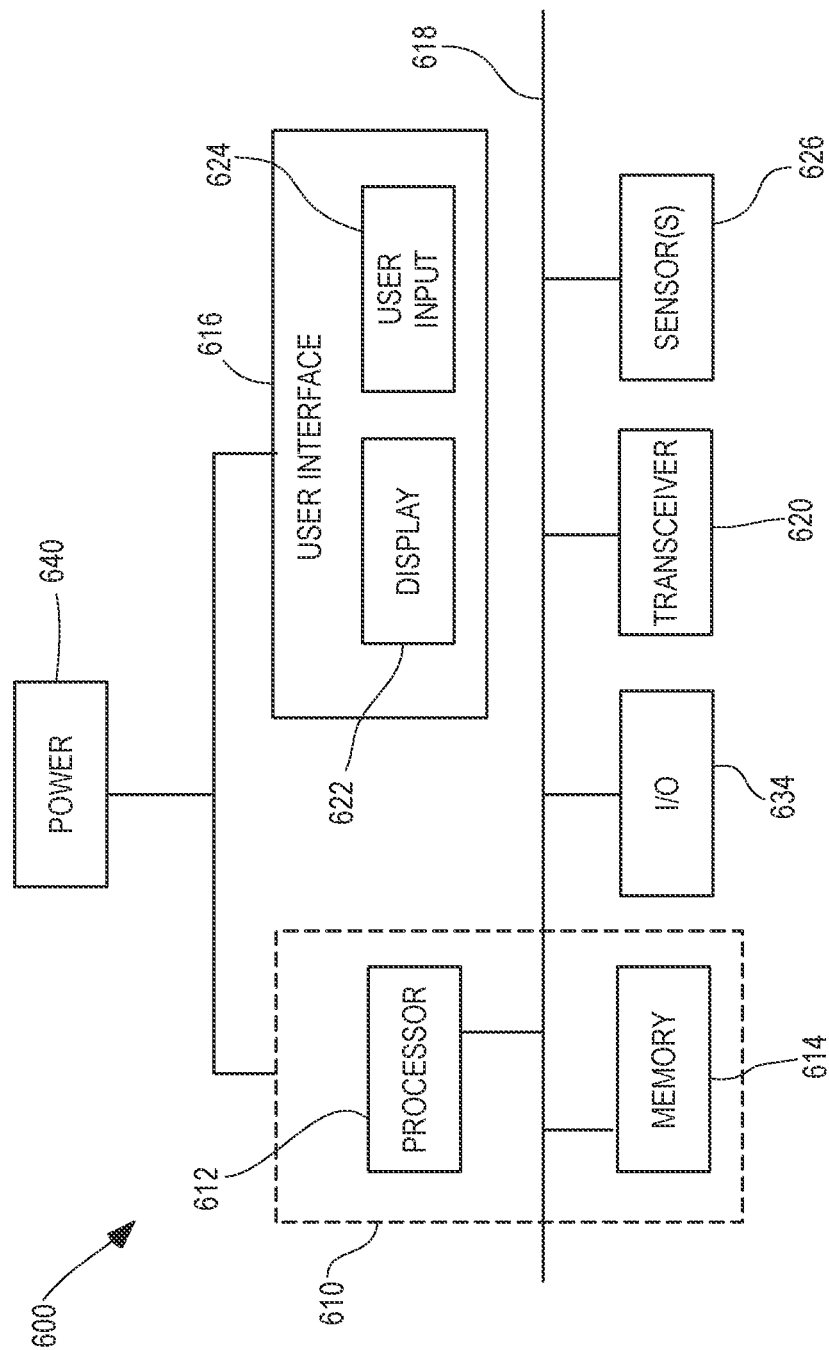

SYSTEM AND METHOD FOR SERVICE
SYNCHRONIZATION

TECHNICAL FIELD

The technical field relates to computer or processing services (e.g., cloud-based services) and synchronizing the contents of databases used by these services.

BACKGROUND

Retail stores use different cloud-based services such as Microsoft Azure to process data and maintain databases. The contents of these databases can, in turn, be used for different purposes by other applications. In these regards, some services/databases are better than others for certain purposes. For instance, one type of service/database may be used directly or indirectly to process sales data and use the data to reorder products. Other services/databases may be used to directly or indirectly control store operations such as where to place or move products within the store.

If the databases are not synchronized, this can create problems in operating retail stores and the applications that utilize these databases may offer erroneous or incorrect solutions. In so doing, the stores will be operated less efficiently and in a non-optimized manner. Current approaches rely on copying massive amounts of files between databases to achieve synchronization. As such, current synchronization approaches are slow and inefficient.

BRIEF DESCRIPTION OF THE DRAWINGS

The above needs are at least partially met through the provision of approaches for service synchronization, wherein:

FIG. 3 comprises a diagram of a system as configured in accordance with various embodiments of these teachings;

FIG. 4 comprises a diagram of a system as configured with various embodiments of these teachings;

FIG. 5 comprises a diagram of a system as configured with various embodiments of these teachings; and FIG. 6 comprises a diagram of a system as configured with various embodiments of these teachings.

Figure 1:
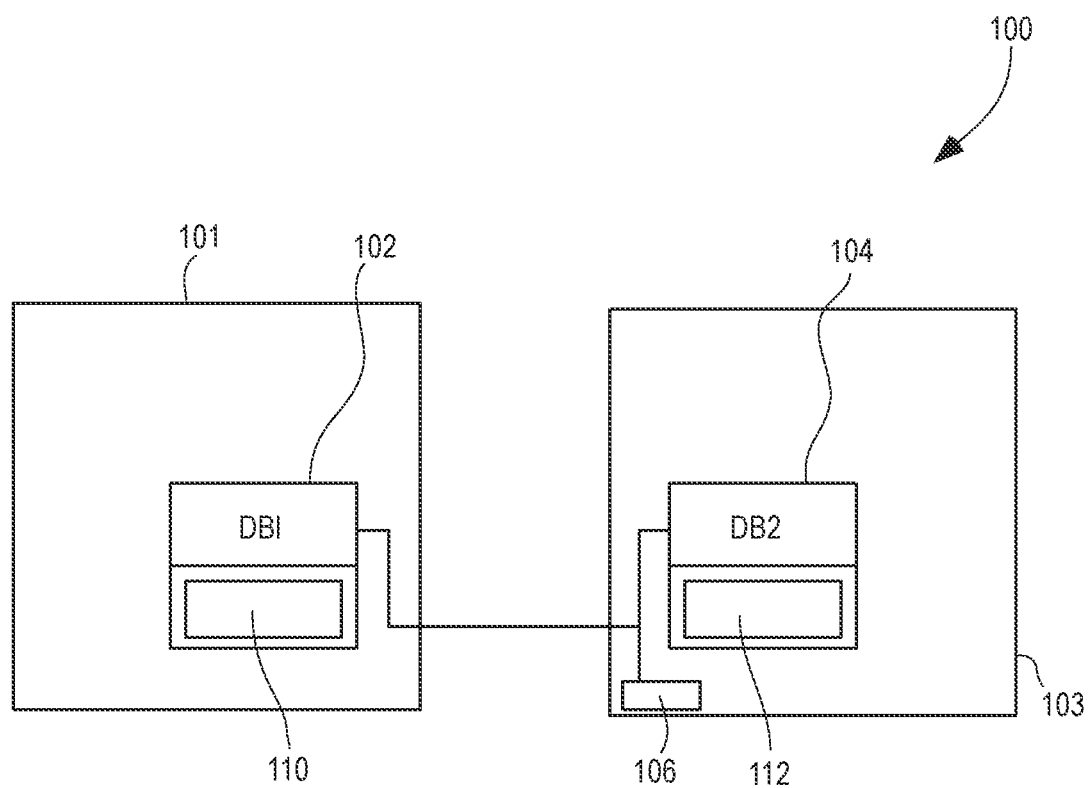
FIG. 1 comprises a diagram of a system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The approaches described herein provide synchronization of data files across different databases used by different services and platforms. The services may be cloud-based services and include databases that include files with various types of data stored in various formats.

The present approaches support data transfer among multiple proprietary data stores. The present approaches can be expanded to include the file systems/object storage-based data stores. Transfers can be leveraged by many data access systems (e.g., Dataproc and Big Query). The present approaches work well under various systems, file formats, or other circumstances, for example, when source files do not have audit columns.

In many settings, businesses and individuals utilize multiple cloud services. Different services or platforms are used because some cloud services are more efficient, better, and/or effective in performing or providing different types of services. For example, the Microsoft Azure data brick platform provides Delta Lake types of services and the Google Big Query provides Data Warehouse types of services. The present approaches allow synchronization of files used by these disparate services without massive file exchanges, e.g., where every file in one service or platform is copied to the other service or platform. By "synchronization," it is meant that the contents in the disparate databases are the same.

Advantageously, the present approaches provide an improved user experience by delivering better recency (e.g., up to a 75%-time savings) and allowing more refreshes to occur. The present approaches also significantly reduce the cost of using cloud services by minimizing the amount of data processed in both clouds (e.g., a 90% savings). The present approaches further support a multi-cloud strategy and makes migrations easy. The present approaches additionally support data transfer among multi cloud property stores such as Hive, Presto, Athena and others. Further, the approaches provide a low-cost Business Community Disaster Recovery solution (dual-cloud strategy reducing the need for separate disaster recovery solutions).

In many of these embodiments, a system includes a first database, a second database, and a control circuit. A first set of files is stored in the first database. A second set of files is stored in the second database.

The first set of files and the second set of files are initially the same. The control circuit is coupled to the first database and the second database. Subsequently, the first set of files are changed and a first listing describing files in the first database and a second listing describing files in the second database are created.

The control circuit is configured to, after the change of files in the first database occurs, determine differences between the first listing of files in the first database and the second listing of files in the second database. Based upon the differences, the control circuit is configured to obtain a list of files no longer used in the first database, a list of newly added files to the first database, and a list of unchanged files in the first database. The control circuit is further configured to remove files from the second database based upon the list of files no longer used in the first database. The control circuit is configured to add files to the second database based upon the list of newly added files to the first database.

In aspects, the first set of files and the second set of files are used to train a neural network. For example, the neural network may be used to determine various store operations. The files are applied to the neural network in a training phase to train the neural network. In the training phase, the neural network is changed and, for example, various weightings used by the neural network may be changed. Once the neural network is trained by application of the files (or data in the files), it can be used by a retail store for other purposes such as to conduct store operations, order products, and/or control delivery vehicles to mention a few examples.

In other aspects, the first set of files and the second set of files are used to control store operations. For example, the files may include information that is used to define planograms or display products.

In other examples, the first set of files and the second set of files are used to control delivery vehicles. For example, the contents of the files may be analyzed and it may be determined if a store using the files needs to reorder products. The analysis is used to controller delivery vehicles and route requested products to specific stores.

In some other examples, the control circuit checks for changes periodically. For example, the control circuit checks for changes once an hour or once a day. Other examples are possible.

In some examples, the first set of files and the second set of files include sales data. The sales data can be used for various purposes such as re-ordering products.

In some other examples, the first database and second database are resynchronized after the removal of files from the second database and the addition of files to the second database.

In yet other examples, the first database and the second database have different configurations. For example, the storage format, hardware, operating speed, or file formats may differ to mention a few examples.

In other aspects, the first set of files and the second set of files comprise tables. In examples, the tables may store sales information in various formats.

In others of these embodiments, a first set of files is stored in a first database that is associated with a first service. A second set of files is stored in a second database associated with a second service. Initially, the first set of files and the second set of files are the same. Subsequently, the first set of files is changed and a first listing of files in the first database is created and a second listing of files in the second database is created.

After the change of files in the first database, differences between the first listing of files in the first database and the second listing of files in the second database are determined by a control circuit. Based upon the differences, a list of files no longer used in the first database is obtained; a list of newly added files to the first database is obtained, and a list of unchanged files in the first database is obtained.

Files from the second database are removed by the control circuit based upon the list of files no longer used in the first database. Files to the second database are added by the control circuit based upon the list of newly added files to the first database.

Referring now to FIG. 1, one example of a system 100 for management and synchronization of files between databases is described. The system 100 includes a first database 102, a second database 104, and a control circuit 106. In examples, these are deployed in a retail store 108. A first set of files 110 is stored in the first database 102. A second set of files 112 is stored in the second database 104.

The first database 102 may be utilized by a first cloud-based service or platform 101 and the second database 104 may be used by a second cloud-based service or platform 103. For example, the first service may be Microsoft Azure and the second service may be a Google Big Query service. As used herein, a service is any platform (e.g., cloud-based platform) that performs processing functions including database management. The services may include servers and network hardware that execute applications.

The first set of files 110 and the second set of files 112 are initially the same. The control circuit 106 is deployed at the second service 103 and is coupled to the first database 102 and the second database 104. Subsequently, the first set of files are changed and a first listing describing files in the first database 102 and a second listing describing files in the second database 104 is obtained or created. Although the control circuit 106 is shown as being deployed at the second service 103, it will be appreciated that the control circuit 106 (and its functionality) can be deployed at the first service 101, at both the first service 101 and the second service 103, or outside (at neither) the first service 101 and the second service 103 (e.g., at a central location such as a home office).

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here.

The control circuit 106 is configured to, after the change of files in the first database occurs, determine differences between the first listing of files in the first database 102 and the second listing of files in the second database 104. Based upon the differences, the control circuit 106 is configured to obtain a list of files no longer used in the first database 102, a list of newly added files to the first database 102, and a list of unchanged files in the first database 102. The control circuit 106 is further configured to remove files from the second database 104 based upon the list of files no longer used in the first database 102. The control circuit 106 is configured to add files to the second database 104 based upon the list of newly added files to the first database 102.

Differences may be determined by comparing the files (or a list of files) in the first database 102 to a list of files in the second database 104. Based upon the identified differences, the control circuit creates the lists.

In aspects, the first set of files 110 and the second set of files 112 are used to train a neural network. The training may be made by the control circuit 106 or by other processing devices. In one example, the neural network may be used to determine or control various store operations. In aspects, files from the first database 102 or the second database 104 are applied to the neural network to train the neural network. During training, the structure and/or contents of the neural network is changed and, for example, various weightings used in the neural network may be changed. Once the neural network is trained by application of the files, the neural network can be used by the store for other purposes such as to conduct store operations. Store operations may include physically operating a store (e.g., turning lights on and off, opening doors), instructing store employees or automated vehicles to move products in the store, or installing products to conform to a planogram.

In some other examples, the first set of files 110 and the second set of files 112 are processed by an application (e.g., being executed at the control circuit 106 or by some other processing device) and used to control delivery vehicles. For example, the contents of the files may be analyzed and it may be determined if the store needs to reorder products. The analysis is used to control the movement and operation of delivery vehicles and route requested products to specific stores.

In some other examples, the control circuit 106 checks for changes in files at the first service or platform 101 periodically. For example, the control circuit 106 checks for changes once an hour or once a day. Other examples are possible. Although as described herein, checks are made as to changes at the first service 101, these approaches can also be applied to detecting changes of the second database 104 at the second service 103 and the same approaches can be used to adjust files at the first database 102 of the first service 101.

In other aspects, the first set of files 110 and the second set of files 112 include sales data. The sales data can be used for various purposes such as re-ordering products. The reordered products are shipped by shipping vehicles, unloaded at a retail store, and used to stock the shelves of the retail store.

In some other examples, the first database 102 and second database 104 are resynchronized after the removal of files from the second database 104 and the addition of files to the second database 104.

In still other examples, the first service 101 and its components (e.g., the first database 102) and the second service 103 and its components (e.g., the second database 104) have different hardware and/or software configurations. For example, the storage format, type of databases, language of computer instructions, instruction format, hardware, operating speed, or file formats may differ to mention a few examples.

In other aspects, the first set of files 110 and the second set of files 112 comprise tables. In examples, the tables may store sales information in various formats. Other examples of file formats are possible.

Figure 2:
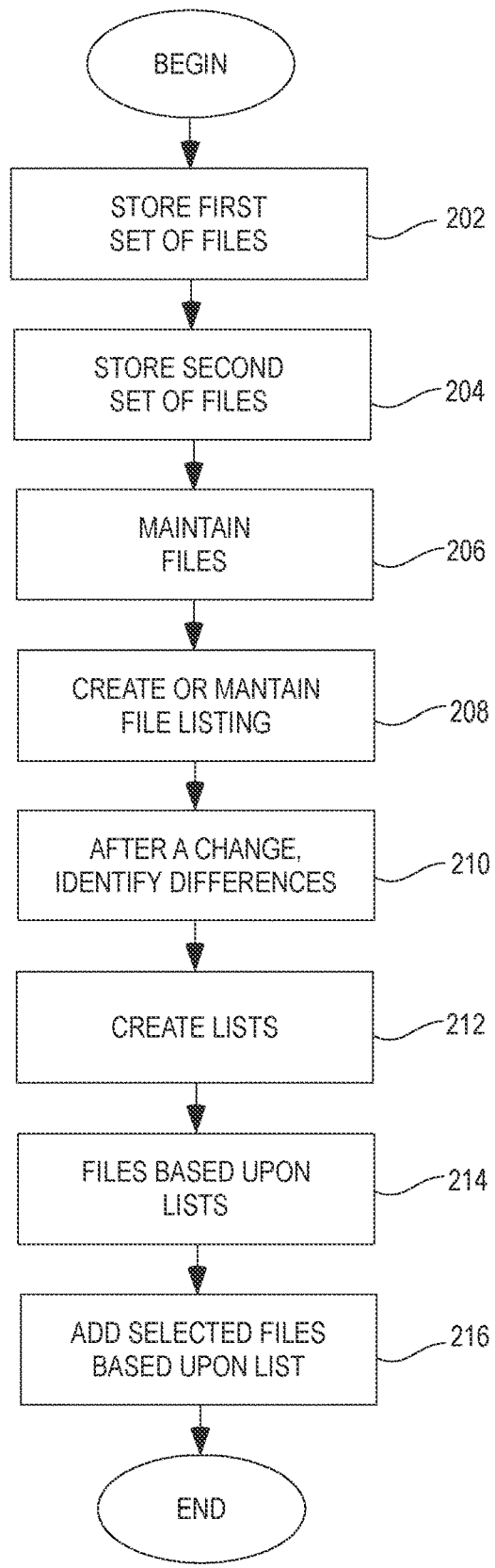
FIG. 2 comprises a flowchart as configured in accordance with various embodiments of these teachings.

Referring now to FIG. 2, an approach for maintaining synchronized files across databases in different service or platforms is described. At step 202, a first set of files is stored in a first database at a first service or platform. At step 204, a second set of files is stored in a second database at a second service or platform. Initially, the first set of files and the second set of files are the same.

At step 206 the first set of files is maintained at the first service or platform.

At step 208 a first listing of files in the first database at the first service or platform is created and/or maintained and a second listing of files in the second database is created and/or maintained.

After the change of files in the first database of the first service or platform, at step 210 differences between the first listing of files in the first database and the second listing of files in the second database are determined.

Based upon the differences, at step 212 a list of files no longer used in the first database is determined or obtained; a list of newly added files to the first database is determined or obtained, and a list of unchanged files in the first database is determined or obtained.

At step 214, files from the second database of the second service or platform are removed based upon the list of files no longer used in the first database at the first service or platform.

At step 216, files are added to the second database of the second service or platform based upon the list of newly added files to the first database.

Referring now to FIG. 3, one example of a system 300 used to obtain data synchronization across different services or platforms is described. The system 300 includes a first service or platform 302 (with a first processing function 304 and a first database 306). In examples, the first service platform or system 302 is an Azure service. The first processing function 304 may be implemented by a control circuit and implements Azure functionality.

In examples, the first database 306 is Blob storage (utilized by the Microsoft Azure service or platform) and is optimized for storing massive amounts of unstructured data. In some examples, the first database 306 includes unstructured data such as text or binary data. The Blob storage may provide images or documents directly to browsers in other applications, and store data for analysis by an on-premises or Azure-hosted service. Other examples and other functionality are possible.

The system 300 also includes a second service or platform 308, which in this example implements Google Cloud Platform (GCP) service. The second service or platform 308 includes a second processing function 310, a second database 312, a third database 314, and a third processing function 316.

As mentioned, the second service or platform 308 implements the GCP service. The second processing function 310 may be implemented via a control circuit and implements the Google GCP functionality.

The second database 312 stores data files (e.g., an external data files) that customers can access and use. The third database 314 includes files only accessible by the second processing function 310.

The third processing function 316 performs the file identification, copying, deletion, and synchronization functions as described herein. It identifies new and changed data and accesses the first database 306 to obtain data and synchronize data as between the first service or platform 302 and the second platform 308. The third processing function 316 may implemented by a control circuit.

In one example of the operation of the system of FIG. 3, a first set of files is stored in a first database 306 of the first service or platform 302. These are in a first table or listing (and the first table may be a delta table showing the files are changed. A second set of files is stored in a second database and/or third database of the second service or platform 308. These files are listed in a second table or listing of all files in the second database or third database of the second platform 308. Initially, the first set of files and the second set of files are the same. Subsequently, the first set of files is changed and the delta table is updated to show the changes.

After the change of files in the first database of the first service or platform 302, differences between the first listing of files in the first database of the first service or platform 302 and the second listing of files in the second database or third database of the second service or platform 308 are determined by the third processing function 316. The first listing and the second listing are compared to find the differences. Based upon the differences, a list of files no longer used in the first database is obtained; a list of newly added files to the first database is obtained, and a list of unchanged files in the first database is obtained. These functions can all be performed by the third processing function 316.

Files from the second database and/or third database of the second service or platform 308 are removed from these databases in the second service or platform 308 based upon the list of files no longer used in the first database of the first service or platform 302. Files are added to the second database or third database of the second service or platform 308 are added based upon the list of newly added files to the first database of the first service or platform 302. These functions can be performed by one or more of the first processing function 304, the second processing function 310, and the third processing function 316.

Referring now to FIG. 4, one example of synchronization is described. In this example, data is synchronized between a first platform or service (e.g., the Azure service) and a second service or platform (e.g., the Google GCP service). Each of the first service or platform and the second service of platform has one or more databases that store data. The data as contained in these databases has to be the same as between the first service or platform and the second service or platform. In aspects, the first platform or service and the second platform or service have different configuration as described elsewhere herein.

As described below, the first database and the second database initially have the same set of files (e.g., F1, F2, and F3). Later, files are changed in the first database to a different set of files (e.g., F1, F5 and F6). A first table (or other listing) (L1) is created and maintained in the first service or platform and shows files at the first service or platform or identifies changes made to the files at the first service or platform (e.g., showing that files F2 and F3 are dropped and files F5 and F6 are added). A second table (or other listing) (L2) at the second service or platform includes a listing of all the files at databases in the second service or platform.

At step 402, the first listing (L1) of files that are at the first service or platform is created (showing files F1, F5, and F6 at the first service or platform).

At step 404, the second listing (L2) of files in the second service or platform is created (showing files F1, F2, and F3 as being at the second service or platform)

At step 406, the differences between the first listing L1 of files at the first service or platform (L1=F1, F5, and F6) and the second listing L2 of files the second service or platform (L2=F1, F2, and F3) are identified. More specifically, the differences are captured in several lists: a first list (408) of files no longer present or being used (F2, F3); a second list (410) of newly added files (F5, F6); and a third list (412) of unchanged files (F1).

At step 414, data files newly added in the first service or platform are obtained and added to temporary storage or memory 416 (e.g., at the second service or platform).

At step 418, files from the first list are removed from databases at the second service or platform. New files from the second list are added to databases at the second service or platform from the temporary storage 416.

At step 420, the second listing (L2) is updated to reflect the updated contents (F1, F5, and F6).

Consequently, files no longer needed are removed from the second service or platform and newly added ones are added to the second service or platform. This approach selectively adds or deletes files from database(s) at the second service or platform without requiring all files from being transferred from databases in the first service or platform to databases in the second service or platform. The files at databases at the first service or platform and databases at the second service or platform can be used to perform various actions including training neural networks, performing store operations, controlling the operation of deliver vehicles, or ordering products. Other examples of operations are possible.

Referring now to FIG. 5, one example of a system 500 that utilizes these approaches is described. The system 500 includes a first platform or service 502, and a second platform or service 504. The first platform or service 502 and the second platform or service 504 provide, process, manage, and/or store data for data science systems 506, data analytic systems 508, reporting systems 510, and operational use case systems 512. Transactional systems 514, 516, and 518 send data to the first platform 502. Transactional systems 520, 522, and 524 send data to the second platform 504.

The first platform or service 502 may be a Microsoft Azure system. The second platform or system 504 may be a Google cloud system. The first platform or service 502 and the second platform or service 504 may include servers, control circuits, electronic memory storage devices, associated software that provide or supply data to the systems 506, 508, 510, and 512, process data for use by the systems 506, 508, 510, and 512, manage data for use of the systems 506, 508, 510, and 512, and/or stores data for the systems 506, 508, 510, and 512. It will be appreciated that the systems 506, 508, 510, and 512 may implemented at least in part using control circuits or other processing devices that execute computer instructions.

The data science systems 506 may include prediction systems. In aspects, these may be machine learning systems or AI systems. For example, the machine learning systems may include neural networks, which are trained. The training data or sets may be obtained from data from the first platform or service 502 and the second platform or service 504. Because the data (e.g., data files) has been synchronized as between the first platform or service 502 and the second platform or service 504, neural networks trained in this way will provide more accurate, effective, and efficient results than if obtained from unsynchronized data. The neural networks can be used to make a large variety of predictions such as predictions as to customer dales, predictions as to future trends, predictions as to products needed in the future, to mention a few examples. It will be appreciated that the training processes alters or changes the neural network (e.g., by changing weightings and other physical parameters of the neural network.

The data analytic systems 508 may determine trends in data. Actions are taken based upon the trends. For example, the data analytic systems 508 may identify whether demand for a product is increasing or decreasing and determine whether to order more of certain products based upon the identified trends.

The reporting systems 510 generates reports. For example, the reporting systems 510 may obtain sales data from the first platform or service 502 and the second platform or service 504 and generate reports. The reports, in aspects, can be supplied to users graphically or electronically on appropriate devices or displays such as personal computers, laptops, smartphones, and the like.

The operational use case systems 512 may predict customer behavior. For example, the operational use case systems 512 may obtain data from the first platform or service 502 and the second platform or service 504 to predict products customers are likely to purchase. The operational use case systems 512 may include user dash boards to display the information to store managers or other personnel.

Data is shared at step 526 between both platforms 502 and 504 so that each platform is using the same data according to the approaches described herein. For example, the approach described with respect to FIG. 4 may be utilized.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the systems described with respect to FIGS. 1-5 above, and/or other above or below mentioned systems or devices, or parts of such circuits, circuitry, functionality, systems, apparatuses, processes, or devices. For example, the system may be used to implement some or all of the control circuits, neural networks, platforms, one or more of the databases, and/or other such components, circuitry, functionality and/or devices. However, the use of the system 600 or any portion thereof is certainly not required.

By way of example, the system 600 may comprise a processor module 612, memory 614, and one or more communication links, paths, buses or the like 618. Some embodiments may include one or more user interfaces 616, and/or one or more internal and/or external power sources or supplies 640. The processor module 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the processor module 612 can be part of control circuitry and/or a control system 610, which may be implemented through one or more processors with access to one or more memory 614 that can store commands, instructions, code and the like that is implemented by the processor module to implement intended functionality. In some applications, the processor module and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the processor module 612. Again, the processor module 612 can be implemented through one or more processors, controllers, central processing units, logic, software and the like. Further, in some implementations the processor module 612 may provide multiprocessor functionality.

The memory 614, which can be accessed by the processor module 612, typically includes one or more processor-readable and/or computer-readable media accessed by at least the processor module 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the processor module 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system, the system comprising:
a first database, a first set of files being stored in the first database according to a file format associated with a Delta Lakes type service, wherein the first database is used in conjunction with the Delta Lakes type service to process sales data for retail location(s);
a second database, a second set of files being stored in the second database and the second database according to a Data Warehouse type service that uses a different file format than the Delta Lakes type service, wherein the second database is used in conjunction with the Data Warehouse type service to train a neural network for determining where to place or move products within the retail location(s);

wherein initially the first set of files are synchronized with the second set of files;

a control circuit coupled to the first database and the second database;

wherein subsequently, the first set of files are changed and a first electronic listing of files in the first database and a second electronic listing of files in the second database are created;

wherein the control circuit is configured to after the change of files in the first database:

determine differences between the first electronic listing of files in the first database and the second electronic listing of files in the second database;

based upon the differences, create an electronic list of files no longer used in the first database, an electronic list of newly added files to the first database, and an electronic list of unchanged files in the first database;

remove files from the second database based upon the electronic list of files no longer used in the first, wherein removing the files from the second database comprises executing electronic operations to modify a data storage of the second database; and add files to the second database based upon the electronic list of newly added files to the first database, wherein adding the files to the second database comprises executing electronic operations to modify the data storage of the second database.

2. The system of claim 1, wherein the first set of files and the second set of files are used to control store operations.

3. The system of claim 1, wherein the first set of files and the second set of files are used to control delivery vehicles.

4. The system of claim 1, wherein the first set of files and the second set of files are used to order products.

5. The system of claim 1, wherein the control circuit checks for changes periodically.

6. The system of claim 1, wherein the first set of files and the second set of files include sales data.

7. The system of claim 1, wherein the first database and second database are resynchronized after the removal of files from the second database and the addition of files to the second database.

8. The system of claim 1, wherein the first set of files and the second set of files comprise tables.

9. A method, the method comprising:

storing in a first database a first set of files according to a file format associated with a Delta Lakes type service, wherein the first database is used in conjunction with the Delta Lakes type service to process sales data for retail location(s);

storing in a second database a second set of files according to a Data Warehouse type service that uses a different file format than the Delta Lakes type service, wherein the second database is used in conjunction with the Data Warehouse type service to train a neural network for determining where to place or move products within the retail location(s);

wherein initially the first set of files are synchronized with the second set of files;

subsequently, changing the first set of files and creating a first electronic listing of files in the first database and a second electronic listing of files in the second database;

after the change of files in the first database:

determining, by a control circuit coupled to the first database and the second database, differences between the first electronic listing of files in the first database and the second electronic listing of files in the second database;

based upon the differences, creating an electronic list of files no longer used in the first database, an electronic list of newly added files to the first database, and an electronic list of unchanged files in the first database;

removing files from the second database based upon the electronic list of files no longer used in the first database, wherein removing the files from the second database comprises executing electronic operations to modify a data storage of the second database; and adding files to the second database based upon the electronic list of newly added files to the first database, wherein adding the files to the second database comprises executing electronic operations to modify the data storage of the second database.

10. The method of claim 9, further comprising controlling store operations using the first set of files and the second set of files.

11. The method of claim 9, further comprising controlling delivery vehicles using the first set of files and the second set of files.

12. The method of claim 9, further comprising ordering products using the first set of files and the second set of files.

13. The method of claim 9, further comprising checking for changes periodically.

14. The method of claim 9, wherein the first set of files and the second set of files include sales data.

15. The method of claim 9, wherein the first database and second database are resynchronized after the removal of files from the second database and the addition of files to the second database.

16. The method of claim 9, wherein the first set of files and the second set of files comprise tables.

* * * * *